United States Patent [19]

Randall

[11] Patent Number: 4,700,438
[45] Date of Patent: Oct. 20, 1987

[54] JEWELRY CLASP

[76] Inventor: Pamela M. Randall, 46, St. John's Road, Driffield, Y025 7RS, Great Britain

[21] Appl. No.: 709,794

[22] Filed: Mar. 8, 1985

[30] Foreign Application Priority Data

Mar. 10, 1984 [GB] United Kingdom ............... 8406344

[51] Int. Cl.$^4$ ............................................. A44B 13/00
[52] U.S. Cl. ............................... 24/599; 24/230.5 TP
[58] Field of Search ........ 24/230.5 TP, 573, 598–600, 24/698, 699, 230.5 R

[56] References Cited

U.S. PATENT DOCUMENTS

| 554,228 | 2/1896 | Beckwith | 24/230.5 TP X |
|---|---|---|---|
| 1,008,578 | 11/1911 | Anderson | 24/599 |
| 1,107,750 | 8/1914 | Boge | 24/599 |
| 2,821,766 | 2/1958 | Moosman | 24/230.5 TP |
| 3,132,395 | 5/1964 | Luketa | 24/599 |
| 3,142,264 | 7/1964 | De Boer | 24/573 X |
| 3,280,438 | 10/1966 | Luketa | 24/698 X |
| 3,496,982 | 2/1970 | St. Pierre | 24/698 X |
| 3,793,681 | 2/1974 | Castevens, Jr. et al. | 24/230.5 TP X |
| 4,049,905 | 9/1977 | Maranell | 24/230.5 TP X |

FOREIGN PATENT DOCUMENTS

| 766448 | 9/1967 | Canada | 24/698 |
|---|---|---|---|
| 313924 | 8/1919 | Fed. Rep. of Germany | 24/699 |
| 293920 | 7/1928 | United Kingdom . | |
| 540913 | 11/1941 | United Kingdom . | |

Primary Examiner—Kenneth J. Dorner
Assistant Examiner—James R. Brittain
Attorney, Agent, or Firm—Burns, Doane, Swecker & Mathis

[57] ABSTRACT

The clasp of the disclosure is of the kind comprising a clasp part and, for engagement therewith, a complementary link member; said clasp part comprising a body formed with a labyrinthine slot open at a surface of the body to permit said member to be passed thereinto to lodge therein remote from the mouth of the slot with part of said member lying externally of the body; the labyrinth being dimensioned so that, with said member and the clasp part in operative positions, said member can be removed from the clasp part only by a relative movement which first entails a change in their relative orientation.

9 Claims, 15 Drawing Figures

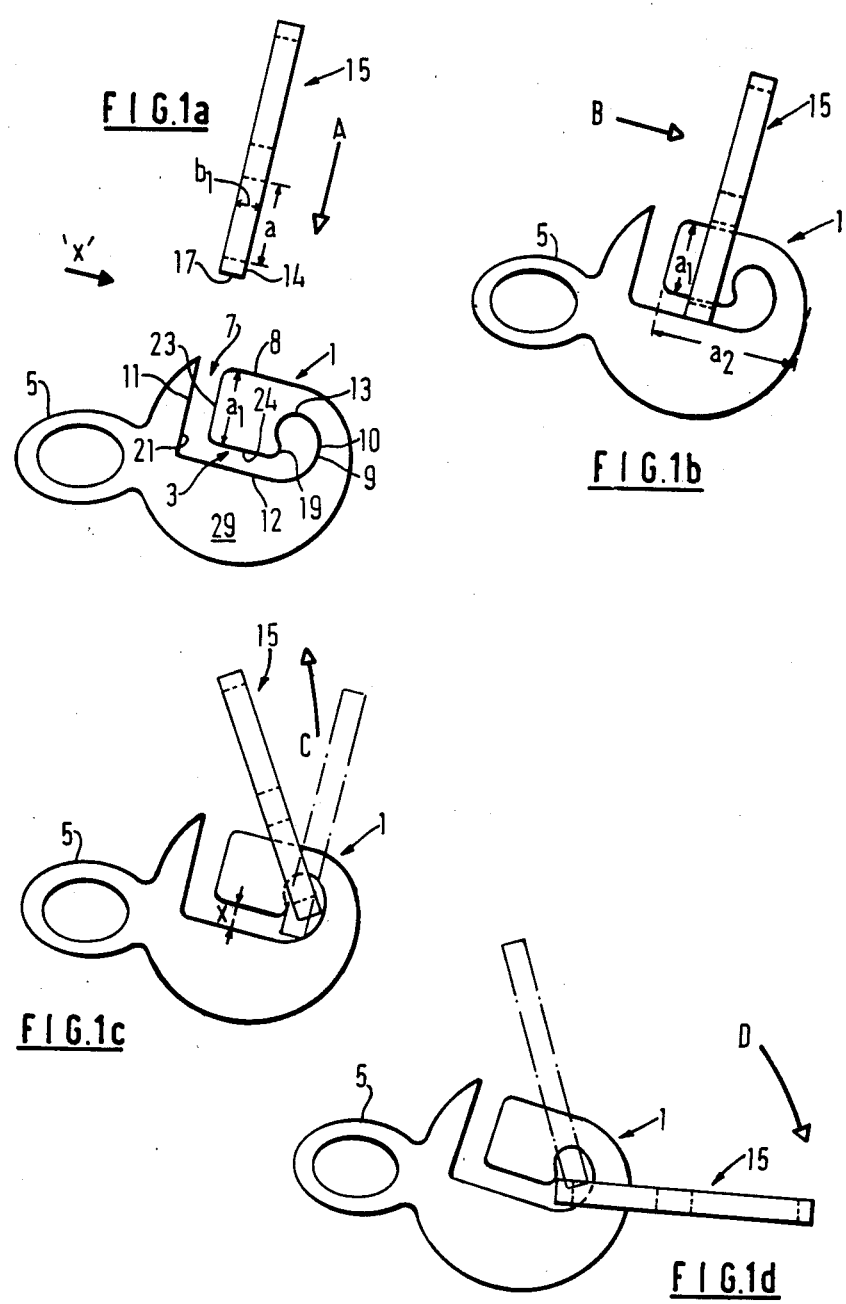

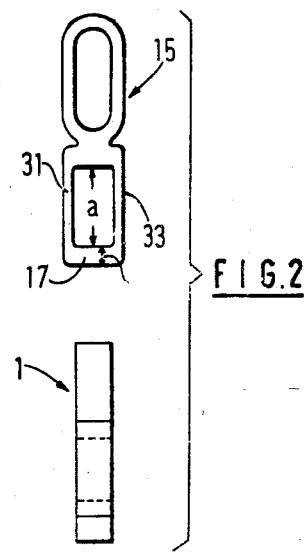
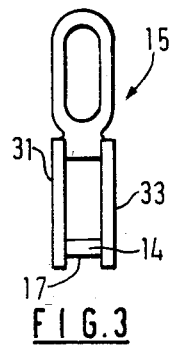
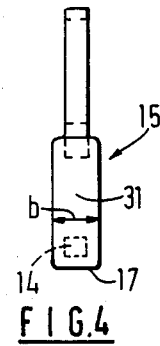
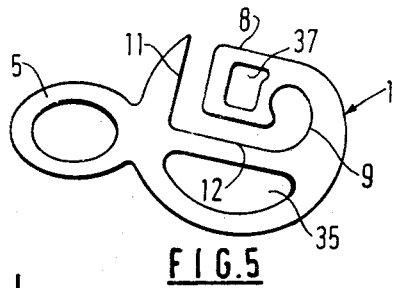
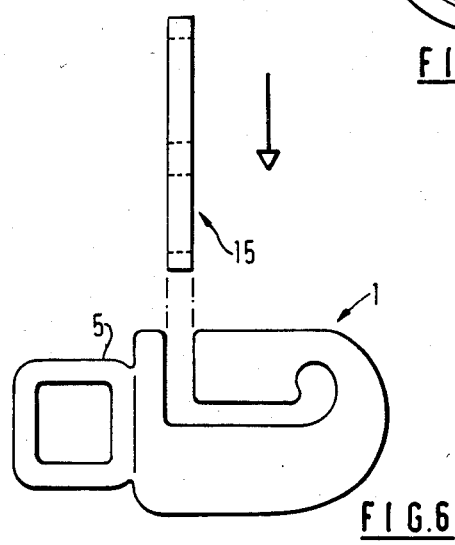
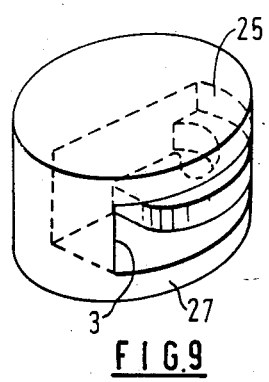

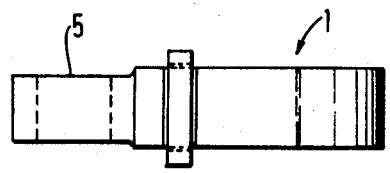
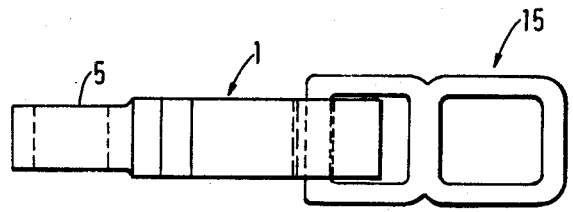
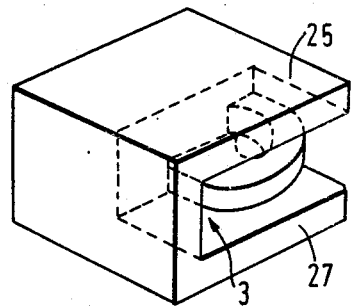
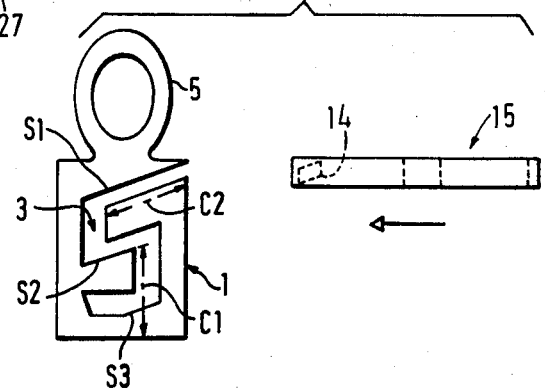
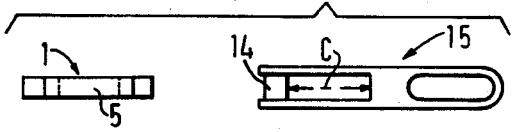

4,700,438

JEWELRY CLASP

FIELD OF THE INVENTION

The present invention relates to a clasp suitable for use on an article of jewellery such as a bracelet or necklace to hold opposite ends thereof together.

BACKGROUND OF THE INVENTION

A clasp is already known from British patent specification No. 540913 of the kind comprising a link member in the form of a jump ring and, for engagement therewith, a clasp part in the form of an open ring member which effectively constitutes a hook having a barb terminating the hook inwardly of the ring. In connecting the two parts of the clasp, the jump ring needs to be negotiated over the barb before the jump ring becomes hooked in position.

However, this clasp can accidentally be released and this could lead to loss or damage to the article being worn.

OBJECTS OF THE INVENTION

It is an object of the present invention to provide a clasp of the kind described above, in which the link member can only be fully engaged and then disengaged from said clasp part by a predetermined series of movements such that inadvertent disengagement of the two parts of the clasp is highly improbable, while retaining a clasp of simple design.

It is a further object of the present invention to provide a clasp of the kind described above, in which said clasp part provides a slot to receive a part of the link member such as to require first a change in the orientation of the two parts of the clasp before the link member can be disengaged.

It is a still further object of the present invention to provide a clasp of the kind described above, in which said clasp part provides a slot to receive a part of the link member such that a part of the slot requires the link member to be passed therealong with an orientation other than the one it assumes in use of the clasp.

It is a still further object of the present invention to provide a clasp of the kind described above, in which said clasp part provides a slot to receive a part of the link member and comprises members effectively to hid the slot from view.

SUMMARY OF THE INVENTION

Briefly, in one aspect, the present invention provides a clasp of the kind comprising a clasp part and, for engagement therewith, a complementary link member; the clasp part being such that said member needs to be negotiated thereinto to assume the position it occupies in use of the clasp, wherein said clasp part comprises a body and a slot formed in said body; the slot following the path of a labyrinth and being open at a surface of the body to permit the link member to be passed along the labyrinth to lodge therein remote from the place on the body at which the slot starts (hereinafter called the mouth) with part of said member lying externally of the body; the labyrinth of said clasp part being dimensioned so that, with said member and the clasp part in the positions they occupy in use, said member can be removed from the clasp part only by a relative movement between said member and clasp part which first entails a change in the orientation of said member and clasp part relatively to one another.

The present invention also provides said clasp part for use with a complementary link member therefor. Preferably, the change in orientation is a relative rotation of the two parts through substantially 90°. It is also preferred that the slot be such as then further to require a relative rectilinear movement between the two parts in at least two directions which are substantially mutually perpendicular to one another. In one embodiment, the further movement therefore takes the form of the two parts relatively describing a general "L" shape, and in another embodiment it takes the form of the two parts relatively describing a general "S" shape.

In one embodiment, the slot follows a generally "U" shaped path; and the limb thereof remote from the mouth is of shorter length than the other limb thereof, and it is also at its remote extremity inturned. Said clasp part may comprise a substantially planar plate of circular or other e.g. rectangular shape; and the invagination may be formed in it by stamping. The plate may be made of metal or plastics or any other suitable material.

In a further aspect, the present invention provides a clasp of the kind comprising a clasp part and, for engagement therewith, a complementary link member; said clasp part being such that said member needs to be negotitated thereinto to assume the position it occupies in use of the clasp, wherein said clasp part comprises a body and a slot formed in said body; said slot following the path of a labyrinth, and being open at a surface of the body to permit said member to be passed along the labyrinth to lodge therein remote from the place on the body at which the slot starts (hereinafter called the mouth) with part of said member lying externally of the body; the slot at least in the part thereof immediately preceding the place said member assumes in use in the slot, being of cross sectional dimension such, and the cross sectional dimension and shape of the portion of said member to pass within the slot, being such, as to prevent any substantial rotation of said member when that portion thereof lies in said part of the slot; and the slot providing a following enlarged portion to permit a relative rotation of the two parts to be effected to the position they assume in use of the clasp.

In a further aspect of the present invention a clasp comprises members spaced from the surfaces of the body at which the slot opens, otherwise than at the mouth thereof, effectively to hide the slot from view. The members may be formed integrally with the body or they may be separately formed and attached thereto. The members may be such or be so treated as to have a decorative appearance at least on the surfaces thereof not facing the body. In the presently preferred embodiment, the members are in the form of substantially planar walls of the same shape as the plate constituting the body.

DESCRIPTION OF PREFERRED EMBODIMENTS

Other features and advantages of the present invention will become apparent from the following description of preferred embodiments taken in conjunction with the accompanying drawings, in which like reference numerals indicate like parts and in which:

FIG. 1, consisting of FIGS. 1a, b, c and d, each showing a front elevation of a clasp part according to the present invention, illustrates how the clasp part is united with a complementary part (being a chain link) to form a clasp;

FIG. 2 is a view of the clasp parts in the direction of arrow "X" in FIG. 1;

FIGS. 3 and 4 are respectively a front elevation and side elevation of a modified complementary part;

FIG. 5 is a front view of modified form of the clasp part of FIG. 1;

FIGS. 6, 7 and 8 are views of a further form of clasp in accordance with the present invention, being respectively a front elevation thereof, a plan view thereof showing the complementary part in one position and a plan view thereof showing the complementary part in another position;

FIGS. 9 and 10 are perspective views of modified forms of the clasp part of FIG. 1;

FIGS. 11 and 12 are respectively a front elevation and plan view of a still further form of clasp in accordance with the present invention.

It is here pointed out that in all the Figures of the drawings, the parts are shown on an enlarged scale in the intersects of clarity; the actual size being approximately half that shown.

Referring now to the drawings, the clasp part shown in FIG. 1 comprises a link member 2 and a clasp part for mutual engagement; the latter comprising a body in the form of a substantially planar disc generally indicated at 1 formed with a slot 3 following the path of a labyrinth or maze; the start of which opens at the periphery of the disc to define the mouth 7 of the slot. The path, in this instance, has the general shape of a "U" with the limb 9 remote from the mouth being shorter than the opposite limb 11 and being somewhat inturned inwardly of the "U" at the remote extremity 13 thereof.

The disc is formed with a flat 8 at the peripheral edge of the disc extending from one side of the slot so that part of the peripheral edge of the disc is substantially parallel with the course of the bridge 12 of the "U", the bridge having a cross-sectional dimension slightly greater than the external diameter of the part of the link member to engage in the invagination.

In this instance, the link member is part of an end link generally indicated at 15, of a chain. In this case, the clasp part would be secured to the opposite link of the chain. The slot of the clasp part also opens at the surface of the body on each major face thereof so that a part 17 of the loop formed by the link 15 can be passed through the mouth of the slot by an approach as shown by arrow "A" in FIG. 1 and along the path as indicated by arrow "B" in FIG. 1b to the remote end thereof (FIG. 1c) to assume the position shown in outline in FIG. 1c. It is then raised, as viewed in FIG. 1c, from the position indicated in outline in that Figure, and pivoted in the direction indicated by arrow "C" in FIG. 1c to the position indicated in full line to draw the end 17 of the link into the inturned end 13 of the slot, and is then pivoted from that position (indicated in outline in FIG. 1d) to the position it is to assume in use of the clasp as indicated in full line in FIG. 1d. The cross-sectional dimension "x" of the bridge 12 is such, and the cross-sectional dimension "y" of the part 14 of the link member passed into the slot and the shape thereof at are such, as to prevent any substantial pivoting of the member when the part 14 lies in the bridge 12. As a result, when the link member is in the position shown in full line in FIG. 1d, it cannot be passed along the bridge 12. In order to permit pivoting of the link member to its final position, the shorter limb 9 of the "U" is formed with a cross-sectional enlargement as indicated at 10 in FIG. 1.

In this connection, it is preferred in order to facilate the user's entering the loop into the slot, that the limb 11 be of a cross-section dimension greater than is strictly needed to permit entry of the loop i.e. it is preferred that it be of greater cross sectional dimension than the bridge 12. In use of the chain, the ends of which are thus clasped together, the link member is virtually incapable of any movement, whether during handling by the user to put it on or take it off or during the time the chain is being worn, that can remove the link member from the body. If the link pivots contrary to the direction of arrows "D" in FIG. 1d from the position shown in full line in FIG. 1d, the part of the link within the slot catches on the lip 19 formed by the turned-in portion 13 of limb 9. If it pivots in the direction of arrow "D" from the position in FIG. 1d, removal is prevented by the chain link 5 to which the body is secured. If, however, the link and body are moved relatively towards one another, removal is stopped by the part 14 of the link. It follows that these movements cannot separate the link 15 from the body.

It will be evident from the above that the link member can only be removed by precisely reversing the movements by which it is moved to the position it assumes in use and that this operation first requires a change in the relative orientation of the link member and clasp part.

In the illustrated embodiment of FIG. 1, the dimension "a" measuring the internal axial length of link 15 is only slightly greater than the length "$a_1$" of the shorter one of the two opposite walls 21, 23 constituting limb 11 and is less than the length "$a_2$" being the length of the shorter wall 24 of bridge 12 plus its rectilinear extension to the periphery of the body, so that, even if the part 14 of the link member could be entered into the bridge 12 of the slot, it could not be removed by a first movement which simply entails a movement of the link member and clasp part towards one another, and would still require in the reverse movement of link 15 to release it, fairly precise positioning of the link in relation to the body to assume the positions shown in FIG. 1 especially due to the presence of the flat 8. The chance of this happening unintentionally is very remote. Therefore in a modification of the illustrated embodiment, the bridge 12 is such that the part 14 of the link member can be entered into it by a movement of the two parts towards one another.

FIGS. 3 and 4 show an alternative link member differing from the link part shown in FIGS. 1 and 2 only in having the lateral flanges 31, 33 of wider dimension i.e. dimension "b" is greater than dimension "$b_1$". The part shown in FIG. 5 is substantially identical to part 1 shown in FIGS. 1 and 2 but is of lighter weight due to cut-out portions 35, 37.

The embodiment of FIGS. 6 to 8 differs from that of FIG. 1 only in shape and in the thickness of disc 1 and integral link 5, and providing a longer bridge 12.

In the modifications shown in FIGS. 9 and 10, the body is covered with wall members 25, 27 spaced from the surfaces of the body at which the slot opens; the only difference between the two modifications being that of the shape of the wall members. The wall members may be secured or made integral with a part of the body as indicated generally at 29 in FIG. 1. If a plastic material is used for the body and wall members, it may be possible integrally to form them.

In the case where the body is made of metal and is to be used with another metal part, it may be welded thereto.

In the embodiment of FIGS. 11 and 12, the body is rectangular in shape and the slot is in the form of a general "S" shape. However, the internal axial dimension "c" of the loop is again less than the dimension "$c_1$" of the body and only slightly greater than the dimension "$c_2$" of the body; but due to the "S" shape, the body provides even greater difficulty in the unintentional separation of the two parts of the clasp. Further, the cross-sectional shape and dimensions of part 14 of the link member and the cross-sectional dimensions of limbs S1, S2 and S3 are such that the link member cannot be pivoted in these limbs, thus again a precise positioning of the member in relation to the clasp part in the movements to engage and disengage the two parts is required.

As will be evident from the above, in the embodiments of FIGS. 1 to 10, the disengagement of the link member from its position shown in full line in FIG. 1d to remove it from the other clasp part entails, following the change in relative orientation to the other clasp part, the two parts relatively to describe a movement along a generally "L" shaped path, that is, a movement in two mutually perpendicular directions, and in the embodiment of FIGS. 11 and 12 the following movement describes a movement along a generally "S" shaped path, that is, a movement in more than two mutually perpendicular directions.

I claim:

1. A jewelry clasp comprising a clasp member and a link member for engagement with said clasp member, said link member including an annular shaped body defining aperture means therein, at least a portion of the annular shaped body forming a bar between opposite sides of said annular shaped body having a cross-section defining a first dimension in a direction generally parallel to a plane of said aperture means and a second dimension, greater than the first dimension, in a direction generally perpendicular to the plane of said aperture means; said clasp member further including a generally plate shaped body defined between parallel first and second major outer surfaces having an elongate slot therein defining a plurality of differently inclined paths, including an entry path, at least one further path as a continuation of said entry path and a blind path as a continuation of said at least one further path; said paths being wide enough to accommodate said first dimension of said bar therein and enable said bar to be displaced along said entry path and said at least one further path and accommodated in said blind path, said at least one further path being of less width than said second dimension of said bar so that once accommodated in the said blind path said bar cannot be returned through said at least one further path unless said first dimension of said bar is aligned with said at least one further path; and, said aperture means defined by said annular shaped body having a dimension perpendicular to said bar which is marginally greater than the length of said entry path for enabling said bar to be displaced along said at least one further path with said first dimension substantially perpendicular to said at least one further path and for preventing substantial rotation of said link member from a substantially perpendicular attitude when said bar is being displaced along said at least one further path.

2. A clasp as set forth in claim 1, wherein said paths are inclined substantially perpendicular to one another.

3. A clasp as set forth in claim 1, wherein said entry path and said further path are a continuation of said entry path and have a generally L-shaped configuration.

4. A clasp as set forth in claim 1, wherein said paths together have a generally zig-zag configuration.

5. A clasp as set forth in claim 3, wherein said paths together have a generally U-shaped configuration defined by said entry path, said further path, and a still further path.

6. A clasp as set forth in claim 5 wherein said entry path and said still further path are side limbs of said generally U-shaped configuration and said still further path is inturned towards said entry path.

7. A clasp as set forth in claim 1, comprising a cover part selectively connected to said clasp body and spaced from and generally parallel to each first and second major outer surface.

8. A clasp as set forth in claim 7, wherein said cover parts are integral with said clasp body.

9. A clasp as set forth in claim 7, wherein said cover parts are separate from said clasp body.

* * * * *